United States Patent [19]

Prinsloo et al.

[11] Patent Number: 4,976,748

[45] Date of Patent: Dec. 11, 1990

[54] VORTEX TUBE SEPARATING DEVICE

[75] Inventors: Willem J. C. Prinsloo, Pretoria; Pierre de Villiers, Hartbeespoort; Marten C. van Dijken, Pretoria, all of South Africa

[73] Assignee: Cyclofil (Proprietary) Limited, Pretoria, South Africa

[21] Appl. No.: 360,160

[22] Filed: Jun. 1, 1989

[30] Foreign Application Priority Data

Jun. 2, 1988 [ZA] South Africa ........................ 88/3923
Feb. 14, 1989 [ZA] South Africa ........................ 89/1144

[51] Int. Cl.$^5$ ............................................ B01D 45/12
[52] U.S. Cl. ............................................ 55/1; 55/457
[58] Field of Search ...................... 55/1, 456, 457, 347, 55/348

[56] References Cited

U.S. PATENT DOCUMENTS

| | | | |
|---|---|---|---|
| 1,360,349 | 11/1920 | Wright | 55/457 |
| 2,323,707 | 6/1943 | Danz | 55/347 |
| 3,444,562 | 5/1969 | Alsobrooks | 55/306 |
| 3,469,566 | 9/1969 | Wilkinson et al. | 55/347 |
| 3,590,560 | 7/1971 | Pall | 55/457 |
| 3,611,679 | 10/1971 | Pall | 55/457 |
| 3,713,279 | 1/1973 | Keller et al. | 55/360 |
| 3,915,679 | 10/1975 | Roach et al. | 55/347 |
| 4,008,059 | 2/1977 | Monson et al. | 55/396 |
| 4,289,611 | 9/1981 | Brockman | 55/457 |
| 4,311,494 | 6/1982 | Conner et al. | 55/394 |

FOREIGN PATENT DOCUMENTS

| | | |
|---|---|---|
| 1465833 | 3/1977 | United Kingdom . |
| 1465915 | 3/1977 | United Kingdom . |
| 2064359 | 6/1981 | United Kingdom . |
| 1592051 | 7/1981 | United Kingdom . |
| 1599006 | 9/1981 | United Kingdom . |

*Primary Examiner*—Bernard Nozick

[57] ABSTRACT

A vortex tube gas cleaning device 10 is used to clean a particle containing gas flow stream of particles. The device 10 has an outer tube 12 having an inlet 14 at an upstream end, and, in series downstream of the inlet 14, a vortex generator 16 in a vortex region 18, and a separation region 19. An inner extraction tube 40 is located at the downstream end of the tube 12 and extends concentrically within the outer tube 12, upstream, cantilever fashion. A peripheral outlet region 22 is defined annularly around the inner tube 40 downstream of the separation region 19 and leads to an outlet port 36. A central outlet region 24 is defined within the inner tube 40 downstream of the separation region 19 and leads to an outlet 48. A ring 50 which is integral with the inner tube 40 extends into the outer peripheral region 22. It has an oblique leading wall 52 leading to a crown defining an annular orifice 54. The wall 52 forms an acceleration region via which flow in the region 22 is accelerated toward the annular orifice 54. The wall 52 commences spatially downstream of a leading edge of an inlet 42 into the tube 40. The leading edge blends into an aerodynamic lip 43.

8 Claims, 2 Drawing Sheets

VORTEX TUBE SEPARATING DEVICE

BACKGROUND OF THE INVENTION

1. FIELD OF THE INVENTION

This invention relates to a separating device suitable for use in treating a particle containing gas flow stream to separate particles from the gas or to clean the gas of particles.

2. DESCRIPTION OF BACKGROUND ART

The kind of separating device to which the invention relates, can more precisely be described as a vortex tube particle recovery device or as a vortex tube gas cleaning device, depending on which aspect of its operation emphasis is placed. This invention more particularly has in mind the cleaning of gas, especially the cleaning of air. Thus, generally, the term vortex tube gas cleaning device will be used in the specification. However, the invention covers also the particle recovery aspect.

3. SUMMARY AND OBJECTS OF THE INVENTION

For convenience, references to direction, more specifically "downstream" and "upstream", must be interpreted in relation to the normal direction of flow of gas through the device.

More specifically, the invention relates to a vortex tube gas cleaning device or particle recovery device suitable for use in treating a particle containing gas flow stream to clean the gas of particles or to recover particles from the gas, the device comprising

- an outer round tube having an inlet at one end which will be an upstream end in use and an opposed end which will be a downstream end in use;
- an axially arranged vortex or rotating flow generator in the tube downstream of the inlet;
- a separation region downstream of the vortex generator;
- an inner round extraction tube, arranged concentrically within the outer round tube toward the downstream end of said outer round tube, said inner round tube having an inlet at a predetermined axial position corresponding to the end of the separation region, and central outlet means at a downstream end thereof;
- a peripheral outlet region annularly intermediate said outer round tube and said inner round extraction tube;
- a central outlet region formed by said inner round extraction tube; and
- outlet means downstream of the peripheral outlet region;
- an acceleration-deceleration formation in the form of a ring having, in series, a divergent portion, a crown, and a convergent portion, the ring being located annularly around the inner round extraction tube and spatially tot he inlet of the inner round extraction tube, to form in the peripheral outlet region, in series, and spaced from the inlet of the inner round extraction tube, an annular acceleration region, an annular orifice and an annular diffuser region.

In accordance with the invention, in treating a particle containing gas flow stream in a device of the kind described, there is provided an apparatus having a method of flow comprising

- an outer round tube having an inlet at one end which will be an upstream end in use and an opposed end which will be a downstream end in use;
- an axially arranged vortex generator in the tube downstream of the inlet;
- a separation region downstream of the vortex generator;
- an inner round extraction tube, arranged concentrically within the outer round tube toward the downstream end of said outer round tube, said inner round tube having an inlet at a predetermined axial position corresponding to the end of the separation region, and central outlet means at a downstream end thereof;
- a peripheral outlet region annularly intermediate said outer round tube and said inner round extraction tube;
- a central outlet region formed by said inner round extraction tube; and
- outlet means downstream of the peripheral outlet region; the method of flow comprising:
- introducing the particle containing gas flow stream axially into the outer round tube via said inlet;
- inducing rotating flow in the particle containing gas flow stream by guiding the gas flow stream through the vortex generator;
- allowing the particles to migrate toward and to concentrate toward the outer periphery of the flow stream while the flow stream flows through the vortex generator and the separation region;
- guiding a particle depleted portion of the flow stream, toward the center of the tube, via the central outlet region through he central outlet means;
- guiding a particle enriched portion of the flow stream, toward the outer periphery of the tube, via the peripheral outlet region through the outlet means including the steps of contracting and accelerating the particle enriched portion of the flow stream in the annular acceleration region and transforming dynamic pressure in the particle enriched flow stream into static pressure by allowing the particle enriched flow stream to diffuse in the annular diffuser region.

The acceleration may be between about 50% and about 300%, preferably about 100%.

The method may include the further step of gaining static pressure in the enriched particle flow stream at the expense of kinetic or dynamic pressure by allowing the flow stream to diffuse or decelerate in a diffuser in the peripheral outlet region downstream of the acceleration region.

Accordingly, the invention extends to a vortex tube gas cleaning device or particle recovery device of the kind described, in which at least a portion of the peripheral outlet region converges or contracts in respect of flow area to form an acceleration region to induce accelerating flow in use.

The convergence or contraction may be formed by a divergence or flaring of the inner round extraction tube. The included angle of flaring or divergence of the inner round extraction tube may be between about 60° and about 135°, preferably about 90°.

The ratio of the flow areas respectively immediately upstream and downstream of the acceleration region may be between about 1.5:1 and about 4:1, preferably about 2:1.

By way of development, a portion of the peripheral outlet region, downstream of the acceleration region, may be in the form of a diffuser arranged to decelerate the particle enriched flow stream.

Further by way of development, the divergence or flaring of the inner round extraction tube may commence spatially downstream of the inlet to the inner round extraction tube, said inlet being in the form of a mouth of aerodynamic shape which has a sharp leading edge and a lip curving inwardly from the leading edge, the radius of curvature of the lip being larger than the thickness of the lip such that a tangent to the lip at the leading edge and extending inwardly and downstream, forms an acute angle with the inner periphery of the inner tube. Preferably, the acute angle lies in the range of 30° to 50°.

Further scope of applicability of the present invention will become apparent form the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
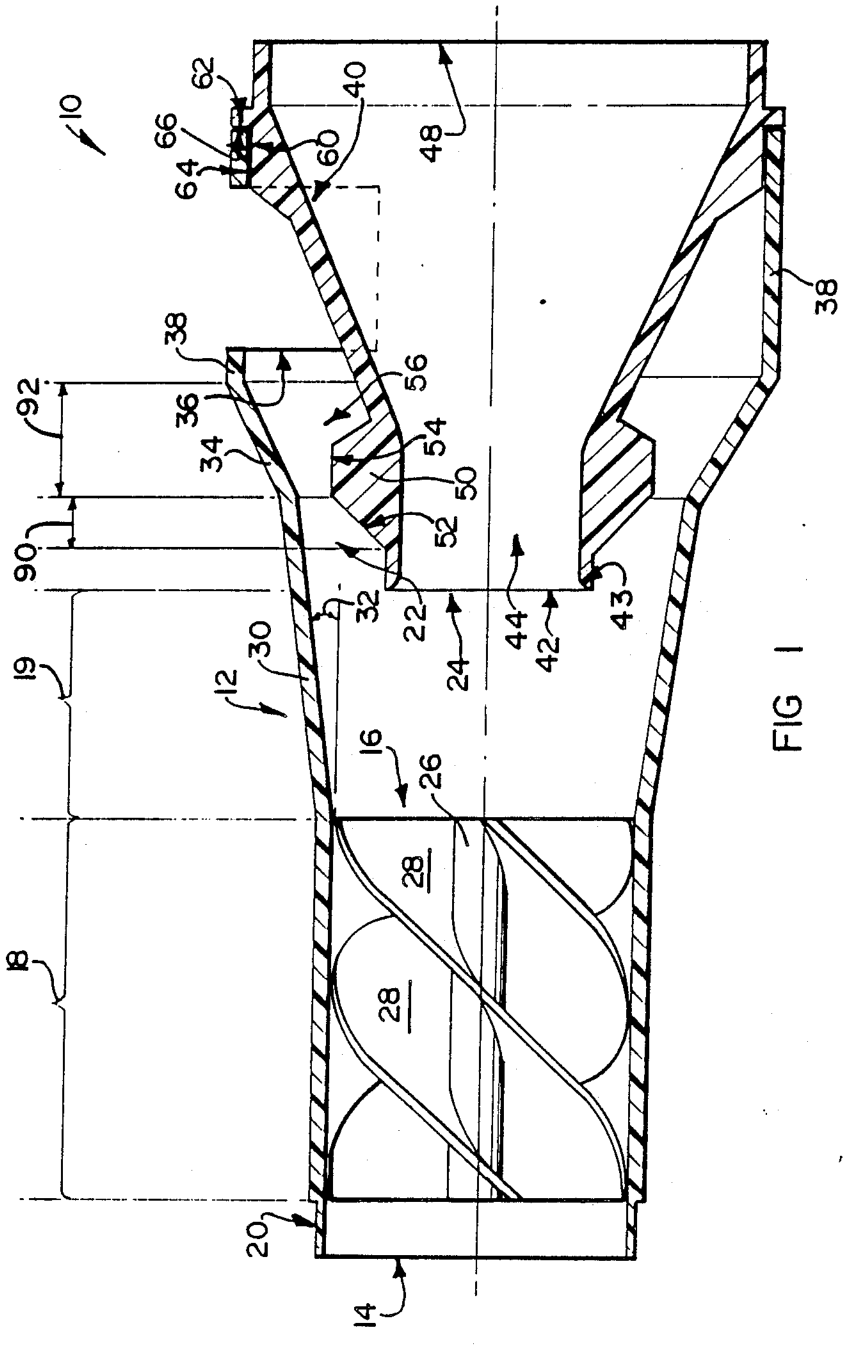
FIG. 1 shows, in axial section, a vortex tube particle recovery device in accordance with the invention.

With reference to FIG. 1 of the drawings, a vortex tube gas cleaning device is generally indicated by reference numeral 10. The device 10 is generally of symmetrical round shape and is assembled of different components of moulded synthetic plastics material. In other embodiments, the devices may be of other materials, such as materials which are abrasion resistant, corrosion resistant or non-corrosive, e.g. suitable types of steel.

The device 10 comprises an outer round tube generally indicated at 12, a vortex generator 16 fitting snugly within the tube 12 toward one end and an outlet core in the form of an inner round extraction tube 40 fitted co-axially within the tube 12 toward the opposed end. The end having the vortex generator will in use be the upstream end, and the opposed end will be the downstream end.

At said upstream end, the tube 12 has an inlet 14. From the inlet 14, the tube 12 extends parallel for a portion of its length to define a vortex generating region 18 within which the vortex generator 16 is located. At its upstream end, the tube 12 has a mounting formation in the form of a recess 20.

The vortex generator 16 has a central core or chine 26 and a pair of helical blades 28 arranged around the core 26, auger fashion. Each blade curves through an angle of 180°. At their peripheries, each blade is at an angle of 57° with the axis.

Downstream of the vortex generating region 18, the wall of the tube 12 diverges as indicated at 30 for a predetermined distance. The included angle of divergence is equal to twice the angle 32 between the diverging wall and the axis of the device 10. The angle 32 is 5° and the included angle is thus 10°.

Downstream of the divergent portion 30, the tube diverges more sharply to form a diffuser wall, which will be described in more detail hereinafter, generally indicated by reference numeral 34.

Downstream of the diffuser wall 34, the tube 12 is parallel as indicated at 38. A single outlet port 36 which extends around a portion of the circumference through an angle of about 120°, is provided in the tube 12 in the parallel portion 38. Instead of a single port, a plurality of circumferentially spaced ports may be provided.

The extraction tube 40 has at an upstream end an inlet 42 identified by its leading edge and which leads into a central passage 44 which blends into a diffuser and extends to an outlet 48 of the extraction tube 40.

The inlet 42 is at a predetermined axial position of the device 10. A separation region 19 is formed between the downstream end of the vortex generator and the inlet 42. In this embodiment, the separation region 19 is divergent as described above. In other embodiments, the separation regions may be parallel.

Downstream of the separation region 19, an outer peripheral or scavenge region 22 is formed annularly between the inner extraction tube 40 and the outer tube 12; and a central or main outlet region 24 is formed bounded by the inner extraction tube 40. Both the scavenge region 22 and the main outlet region 24 are downstream of the separation region 19.

An annular inlet to the scavenge region 22 is formed around the leading edge 42. Closely spaced downstream of said annular inlet, a ring 50 which is integral with the inner extraction tube 40 projects into the scavenge region 22. The ring 50 forms an oblique leading wall 52 which, in use, contracts the flow in an acceleration region 90 in the scavenge region toward an annular orifice 54 defined annularly outside the crown of the ring 50. The oblique leading wall 52 forms a frusto conical surface having an included angle lying in the range of about 60° to about 135°, generally about 90°.

The diverging wall portion 34 forms a diffuser region 92 in the scavenge region 22 downstream of the acceleration region 90.

Toward its downstream end, the inner extraction tube 40 forms a spigot portion 60, which may be slightly taper if desired. The spigot 60 terminates in an outwardly extending flange having a shoulder 62. The spigot 60 fits snugly within the end portion 64 of the tube 12 and the end 66 of the tube 12 checks the shoulder 62. Thus, the inner extraction tube 40 is concentrically and axially located relative to the outer tube 12. The inner extraction tube 40 extends cantilever fashion in an upstream direction to render the scavenge region 22 uninterrupted or continuous. Thus the flow passage through the scavenge region 22 including the annular orifice 54 is likewise uninterrupted or continuous.

In use, a particle containing gas flow stream is introduced into the tube 12 via the inlet 14. Rotating flow is induced in the flow stream by the vortex generator 16 while the flow stream moves through the vortex generating region 18. When the rotating flow stream enters the separation region 19, it diffuses outwardly as allowed by the divergence 32.

The rotating nature of the flow stream causes centrifugal forces to act on the particles, which are heavier than the gas in the flow stream, and to induce the particles to migrate outwardly and concentrate toward the outer periphery of the flow stream.

Generally, the particles are concentrated or enriched in the peripheral portion of the flow stream and the central portion of the flow stream is depleted of particles.

As the particle enriched peripheral portion of the flow stream flows into the scavenge region 22, it is first accelerated as it is contracted in the acceleration region 90 along the oblique wall 52 into the orifice 54, and is thereafter decelerated in the diffuser region 92 along the diffuser wall 34. The particle enriched portion of the flow stream moves into a plenum 56 from where it exits via the outlet port 36, or via the plurality of circumferentially spaced ports if those are provided instead.

The particle depleted portion of the flow stream enters the central or main outlet region via the inlet 42, is diffused in the diffuser and exits via the outlet 48.

Figure 2:
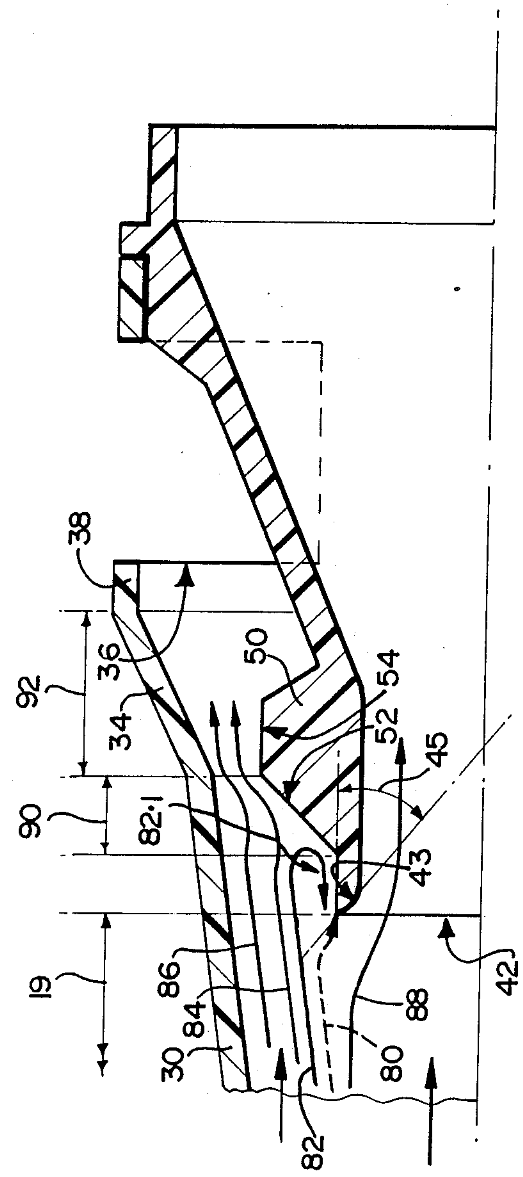
FIG. 2 shows, fragmentarily, to a larger scale, in axial section, flow through a portion of the device of FIG. 1.

With reference also to FIG. 2, the inlet 42 has an inwardly curved lip 43 leading inwardly and downstream from its leading edge. The radius of curvature of the lip 43 is more than the thickness of the inner tube 40 at the inlet 42 resulting in the lip having a tangent, at the leading edge, at an acute angle to the axis of the device 10. In this embodiment, the acute angle is about 40° as indicated at 45. From the inwardly curved lip, the inner periphery of the extraction tube 30 extends parallel for a short distance and then diverges to form a diffuser downstream of the inlet 42.

With reference more specifically to FIG. 2, flow lines of the flow stream through the device 12 are shown in solid lines. Intuitively, one would expect that there will be one flow line 80 which ends on the leading edge 42. Particles entrained in flow elements radially outwardly of said flow line 80 would flow through the annular peripheral outlet region to form part of the particle enriched flow stream such as those indicated by flow lines 84 and 86. Conversely, flow elements radially inwardly of the flow line 80 and which have little or no particles entrained therein would flow into the central outlet region to form part of the particle depleted flow stream such as indicated by flow line 88. However, the Inventors have found such an hypothesis to be incorrect.

The Inventors do not wish to be bound by theory. However, it is believed that a theoretical explanation of flow in the peripheral outlet region will enhance the understanding of the invention.

In a rotating flow field, static pressure increases with radial position from an axis of the rotating flow field. Thus, static pressure forces tend to urge flow elements inwardly. Centrifugal forces on elements in the flow field act in the opposite direction and tend to urge elements outwardly. In the case of heavier particles, the centrifugal forces dominate and such particles move outwardly in the flow field. In the case of lighter flow elements such as the gas components, the pressure forces dominate and urge such elements or such flow inwardly. This is the reason why the heavier particles in the particle containing gas flow stream concentrate outwardly toward the periphery of the flow stream.

However, when a flow element in the flow stream impinges on an obstruction, such as a wall, the rotational nature of its flow ceases and thus the centrifugal forces cease to act on such element. However, the pressure gradient is still present and urges such element inwardly.

The divergence 52, or the boundary layer associated with the divergence 52 acts as such an obstruction. Thus, flow elements impinging upon the divergence 52 or on its boundary layer will be subjected to a pressure gradient tending to move such element inwardly and thus also slightly upstream, i.e. into the particle depleted flow stream. Such flow tendency is illustrated by flow line 82 and more specifically at 82.1. Theoretically, such a flow line exists for which the forces at the point of impingement balance i.e. it will move neither forward nor in reverse. This point of impingement is known as the point of reverse flow or flow reversal.

Particles in the scavenge region are entrained into the reverse flow, thereby reducing the efficiency of separation.

The Inventors have found that, by accelerating the particle enriched flow stream in the acceleration region 90, the point of flow reversal is moved upstream and radially inwardly. Thus, acceleration of the particle enriched flow stream ameliorates the undesirable tendency of flow reversal described above.

In the diffuser region 92, static pressure is gained at the expense of dynamic or kinetic pressure. Such gaining of static pressure at the expense of kinetic or dynamic pressure reduces the pressure drop between the inlet 14 and the outlet part 36 and thus increases the efficiency of the device 10 from an energy consumption point of view.

The Inventors have found in tests that the aerodynamic shape of the inlet 42 causes a substantial decrease in total pressure drop equal to about 15% of the total pressure drop compared to other devices which are not in accordance with this aspect of the invention. Instead of enjoying the benefit of the pressure drop, this allows one the option of using an extraction tube of smaller inner diameter which gives rise to a higher total mass efficiency and without an increase in pressure drop, compared to other devices known to the Inventors.

The Inventors have further established that the flow characteristics of the device are much more stable compared to other devices known to them. In such other devices known to them it was found that instability in the form of fluctuations in total pressure drop and volume flow is an inherent characteristic. In other devices, fluctuations of the point of flow reversal result in more contamination of the particle depleted flow stream by particles from the scavenge region. In devices of the invention, such fluctuations were at least reduced, in most cases substantially eliminated, and the adverse contamination was likewise at least reduced and in most cases substantially eliminated.

In a test sample of the general configuration as illustrated, having an included angle of divergence of 7°, an outer tube inner diameter of 18 mm, a total length of 60 mm, a vortex generating region length of 20 mm, a vortex angle of 180° and a central orifice inner diameter of 10 mm, and operating at a total pressure drop of 4 inch standard water gauge (about 1 kPa) and an air mass flow of 4,6 gram per second, a total mass efficiency of dust removal of about 97% was obtained for AC coarse dust and operating at a 100% cut, i.e. no scavenge flow.

For the same sample, and operating at 90% cut, the total pressure drop was 4 inch standard water gauge (about kPa), the air mass flow was 4,6 gram per second in the main flow stream, and the separation efficiency was more than 98%.

Both tests were done with AC coarse dust.

The Inventors have made inventive contributions to a number of aspects of separating devices of the kind to which this invention relates. The instant invention emphasizes primarily one such aspect namely the acceleration of flow in the outer peripheral region, and the subsidiary and related aspect of an aerodynamic central inlet. It is to be appreciated that the features of the current invention, together with features emphasized in co-pending applications by the same inventors, give rise to a number of advantages. Herein, those advantages to which the current invention contributes substantially, are highlighted. It is to be appreciated that the features of the current invention in isolation, are not necessarily the sole factors in the advantages mentioned.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. In an apparatus for treating a particle containing gas flow stream to clean the gas of particles or to recover particles from the gas the apparatus comprising:
 - an outer round tube having an inlet at one end which will be an upstream end in use and an opposed end which will be a downstream end in use;
 - an axially arranged vortex generator in the tube downstream of the inlet;
 - a separation region downstream of the vortex generator;
 - an inner round extraction tube, arranged concentrically within the outer round tube toward the downstream end of said outer round tube, said inner round tube having an inlet at a predetermined axial position corresponding to the end of the separation region, and central outlet means at a downstream end thereof;
 - a peripheral outlet region annularly intermediate said outer round tube and said inner round extraction tube;
 - a central outlet region formed by said inner round extraction tube; and
 - outlet means downstream of the peripheral outlet region;
 - an acceleration-deceleration formation in the form of a ring having, in series, a divergent portion, a crown, and a convergent portion, the ring being located annularly around the inner round extraction tube and spatially to the inlet of the inner round extraction tube, to form in the peripheral outlet region, in series, and spaced from the inlet of the inner round extraction tube, an annular acceleration region, an annular orifice and an annular diffuser region;
 - the method of flow comprising:
   - introducing the particle containing gas flow stream axially into the outer round tube via said inlet;
   - inducing rotating flow in the particle containing gas flow stream by guiding the gas flow stream through the vortex generator;
   - allowing the particles to migrate toward and to concentrate toward the outer periphery of the flow stream while the flow stream flows through the vortex generator and the separation region;
   - guiding a particle depleted portion of the flow stream, toward the center of the tube, via the central outlet region through the central outlet means;
   - guiding a particle enriched portion of the flow stream, toward the outer periphery of the tube, via the peripheral outlet region through the outlet means including the steps of contracting and accelerating the particle enriched portion of the flow stream in the annular acceleration region and transforming dynamic pressure in the particle enriched flow stream into static pressure by allowing the particle enriched flow stream to diffuse in the annular diffuser region.

2. A method as claimed in claim 1 which accelerating the particle enriched portion of the flow stream is between about 50% and about 300%.

3. In an apparatus as claimed in claim 1, in which the inlet to the inner round extraction tube is in the form of a mouth of aerodynamic shape which has a sharp leading edge and a lip curving inwardly from the leading edge, the radius of curvature of the lip being larger than the wall thickness of the inner round extraction tube such that a tangent to the lip at the leading edge and extending inwardly and downstream, forms an acute angle with the inner periphery of the inner tube, the method comprising the step of guiding said particle depleted portion of the flow stream aerodynamically into the central outlet region through said mouth of aerodynamic shape.

4. A vortex tube gas cleaning device or particle recovery device comprising:
 - an outer round tube having an inlet at one end which will be an upstream end in use and an opposed end which will be a downstream end in use;
 - an axially arranged vortex generator in the tube downstream of the inlet;
 - a separation region downstream of the vortex generator;
 - an inner round extraction tube, arranged concentrically within the outer round tube toward the downstream end of said outer round tube, said inner round tube having an inlet at a predetermined axial position corresponding to the end of the separation region, and central outlet means at a downstream end thereof;
 - a peripheral outlet region annularly intermediate said outer round tube and said inner round extraction tube;
 - a central outlet region formed by said inner round extraction tube; and
 - outlet means downstream of the peripheral outlet region;
 - an acceleration-deceleration formation in the form of a ring having, in series, a divergent portion, a crown, and a convergent portion, the ring being located annularly around the inner round extraction tube and spatially to the inlet of the inner round extraction tube, to form in the peripheral outlet region, in series, and spaced from the inlet of the inner round extraction tube, an annular acceleration region, an annular orifice and an annular diffuser region.

5. A device as claimed in claim 4 in which the included angle of the divergent portion of the acceleration-deceleration formation is between about 60° and about 135°.

6. A device as claimed in claim 4, in which the ratio of the flow areas respectively immediately upstream and downstream of the acceleration region is between about 1.5:1 and about 4:1.

7. A device as claimed in claim 4 in which the inlet to the inner round extraction tube is in the form of a mouth of aerodynamic shape which has a sharp leading edge and a lip curving inwardly from the leading edge, the radius of curvature of the lip being larger than the wall thickness of the inner round extraction tube such that a tangent to the lip at the leading edge and extending inwardly and downstream, forms an acute angle with the inner periphery of the inner tube.

8. A device as claimed in claim 7 in which the acute angle lies in the range of 30° to 50°.

* * * * *

UNITED STATES PATENT AND TRADEMARK OFFICE
CERTIFICATE OF CORRECTION

PATENT NO. : 4,976,748

DATED : December 11, 1990

INVENTOR(S) : Willem J.C. Prinsloo, Pierre de Villiers, and Marten C. van Dijken It is certified that error appears in the above-identified patent and that said Letters Patent is hereby corrected as shown below:

On the Title page, item [56]
References Cited U.S. PATENT DOCUMENTS change "3,444,562 5/1969 Alsobrooks .......... 55/306" to -- 3,444,672 5/1969 Alsobrooks .......... 55/306 -- and change "3,713,279 1/1973 Keller et al. .......... 55/360" to

-- 3,713,280 1/1973 Keller et al. .......... 55/360 --

Signed and Sealed this

Ninth Day of November, 1993

Attest:

BRUCE LEHMAN

*Attesting Officer* *Commissioner of Patents and Trademarks*